United States Patent Office 3,293,206
Patented Dec. 20, 1966

3,293,206
STABILIZED POLYETHYLENE COMPOSITIONS HAVING ANTI-BLOCK CHARACTERISTICS
Shaffer Evatt Horne, Texas City, Tex., assignor to Monsanto Company, a corporation of Delaware
No Drawing. Filed Dec. 6, 1963, Ser. No. 328,510
6 Claims. (Cl. 260—41)

This invention relates to improved ethylene polymer compositions. More particularly, it relates to ethylene polymer and copolymer compositions having good anti-block characteristics which are stabilized against molecular degradation under conditions of elevated temperature and mechanical working.

Polyethylenes having numerous valuable properties which permit them to be used in the manufacture of pipe, film, wire coating, or various molded objects such as bottles and the like. It has been observed that these polymers, under conditions of elevated temperatures either developed by mechanical working in extruders or developed in injection molding machines, undergo molecular degradation resulting in a deterioration of physical properties. Adequate stabilization of such polymers is of utmost importance in order to protect the polymer during fabrication and use. Generally, the molecular breakdown which occurs in these polymers under conditions of elevated temperature or mechanical working during fabricating is evidenced by a substantial increase in the melt index of the polymer.

This problem of stabilization is aggravated in the film manufacturing field because certain substances must be added to the polymer prior to the manufacture of film to eliminate blocking. Blocking can be defined simply as the tendency for film surfaces to adhere to each other or to resist separation, either due to molecular adhesion or vacuum formation between film layers. The degree of blocking is indicated by the clarity of the film and a low haze value is characteristic of high clarity film while a high haze value is characteristic of low clarity film. In practice, film layers are normally separated by a combination of sliding and lifting forces. The lifting component is resisted by blocking forces and the sliding component is resisted by frictional forces. Blocking can be measured as the perpendicular force required to separate one film layer from another.

The blocking of polyethylene films is a more serious problem today because of the wide use of high clarity films which are characterized by having surface haze of 15 percent or less. Heretofore, surface haze values for most polyethylene films have been above 15 percent, or in most cases about 30 percent, before technological advancement in film manufacture was accomplished. But, as film clarity has been improved with a corresponding decrease in haze values to the range of 3 to 15, the problem of blocking became much more serious. This problem has been solved to a large extent by the addition of finely divided siliceous matter, principally diatomaceous earth, sold under the trade name of "Superfloss" by Johns Manville Co., and other compositions usually containing certain proportions of siliceous matter. U.S. Patent 3,028,355 to Gerald R. Toy et al., is directed to a polyethylene composition containing minor amounts of diatomaceous earth.

Because of the anti-block agents required in polyolefin film compositions, stabilization has been made much more difficult since such anti-block agents impart a substantial degrading effect to the polymer. Therefore, the combination of molecular breakdown and degradation which polyethylene undergoes because of the temperature and mechanical working conditions during the fabrication and the degrading effect of the diatomaceous earth required in high clarity polyethylene films, stabilizing agents have been required in ever increasing quantities.

It has now been discovered that alkali treated silica, preferably diatomaceous earth, improves the anti-block characteristics of ethylene polymers and copolymers without promoting degradation of the polymer and thereby permits the use of none or lower quantities of stabilizers.

It is, therefore, an object of this invention to provide an ethylene polymer or copolymer composition which is stabilized against thermal degradation and has good anti-block characteristics. Another object of this invention is to provide an ethylene polymer or copolymer which can be processed under conditions of elevated temperatures and mechanical working without substantial degradation. Another object is to provide a polyethylene composition which when formed into film shows outstanding resistance to blocking without rapid degradation when exposed to air and heat. Another object is to provide a method for improving the anti-block properties of ethylene polymers and copolymers without degradation of the same at elevated temperatures. These and other objects and advantages of the invention will be apparent to those skilled in the art from the following description.

According to this invention, there are provided ethylene polymer or copolymer compositions and a method for preparing the same comprising said polymer or copolymer and an alkali-treated silica, preferably diatomaceous earth, said silica imparting good resistance to blocking when said composition is formed into film without promoting degradation under conditions of elevated temperature and mechanical working. If desired, a conventional stabilizer may also be included in the composition, but usually a smaller amount of such stabilizer will be required than is used with the diatomaceous earth of the prior art.

The following examples are presented as being typical and should not be construed to unduly limit the invention.

*Example I*

A sample of diatomaceous earth, sold under the trade name of "Superfloss," was treated by contacting said diatomaceous earth with a solution of 28% aqueous ammonia for approximately 10 minutes. The diatomaceous earth was separated from the aqueous ammonia by filtering and was then washed with water and dried in an oven at a temperature of 100° C. for about 24 hours. The treated diatomaceous earth was then compounded by intensive mixing in a Banbury mixer into a quantity of polyethylene produced via the usual high-pressure, free-radical polymerization process and having a density of about 0.920. The quantity of diatomaceous earth incorporated into the polyethylene was 0.15% by weight. The sample of polyethylene containing the diatomaceous earth was placed in an oven and maintained at 100° C. for 24 hours. At the end of that period of time, the melt index of the sample had increased from 2.2 to 3.7, thus showing that there was little degradation of the polymer. The anti-block property of the polyethylene film, as determined by the force required to separate two layers of film, was 0.80 gm. per centimeter and the polymer was found to have a haze value of 5.2 based on an arbitrary scale of light scattering with 0 being the best.

*Example II*

A sample of the diatomaceous earth used in Example I was treated in exactly the same manner as in Example I except that the alkaline solution used was an 8% sodium carbonate solution. The treated diatomaceous earth was incorporated into a high-pressure polyethylene sample by intensive mixing in exactly the same manner and in the same quantity as Example I. The sample was then oven aged at 100° C. for 24 hours and at the end of that period of time the melt index had risen from 2.1 to 3.3. The anti-block property of the polyethylene film was determined to be 0.81 gm. per centimere and haze was 5.1.

*Example III*

A sample of diatomaceous earth identical to that used in Example I was treated in the same manner as that of Example I, but with a 6% solution of a mixture of di-sodium and tri-sodium phosphate in equi-molar quantities. The treated diatomaceous earth was incorporated into a high-pressure polyethylene sample of about 0.920 density in exactly the same manner as Example I and in the same quantity and was then oven aged at 100° C. for 24 hours. At the end of that period of time, the melt index of the sample was found to have increased from 2.1 to 2.4. The anti-block property of the polyethylene film was determined and found to be 0.82 gm. per centimeter and the haze was 5.2.

*Example IV*

A sample of the diatomaceous earth identical to that used in Example I was treated in the same manner as that of Example I, but with a 10% slurry of calcium hydroxide. The treated diatomaceous earth was incorporated into a high-pressure polyethylene sample of about 0.920 density in exactly the same manner as Example I and in the same quantity. The sample was then oven aged at 100° C. for 24 hours. At the end of that period of time, the melt index of the sample was found to have increased from about 2.0 to about 3.0. The anti-block property of the polyethylene film was determined to be 0.80 gm. per centimeter and the haze was 5.1.

*Example V*

A high-pressure polyethylene sample identical to that in Example I was blended in a Banbury mixer with 0.15% by weight of diatomaceous earth, sold under the trade name of "Superfloss," which had not been treated by the use of an alkaline solution as had the samples in Examples I–IV. This sample was then oven aged for 24 hours at 100° C. and at the end of that time the melt index was found to have increased from 2.1 to 6.0. The anti-block property of the polyethylene film was found to be 0.82 gm. per centimeter and the haze was 5.2.

*Example VI*

A quantity of diatomaceous earth, sold under the trade name of "Superfloss," was treated in the same manner as that of Example I with the alkaline solution of Example III. A quantity of this treated diatomaceous earth was incorporated into a high-pressure polyethylene sample having a density of about 0.920 so that the total quantity of diatomaceous earth was 0.15% by weight. A stabilizer compound, 2,6-di-tert-butyl-4-methylphenol, known as Ionol, and oleamide as a slip additive, were also incorporated into the polyethylene sample by intensive mixing so that the quantity of these two additives were 0.0025% by weight and 0.10% by weight, respectively. This sample of polyethylene was then oven aged at 100° C. for approximately 500 hours and the melt index was found to have increased from 2.0 to 12.9 during that period of time. The anti-block property of the polyethylene film was determined to be 0.83 gm. per centimeter and the haze was 5.2.

*Example VII*

A high-pressure polyethylene sample identical to that of Example V had incorporated therein 0.15% by weight of untreated diatomaceous earth, sold under the trade name of "Superfloss," 0.10% by weight of oleamide as a slip additive and 0.0025% by weight of 2,6-di-tert-butyl-4-methylphenol as a stabilizer. After oven aging of the sample at 100° C. for approximately 500 hours, the melt index of the polyethylene was found to have increased from 2.1 to 48.0. The anti-block property of the polyethylene film was found to be 0.81 gm. per centimeter and the haze was 5.1.

*Example VIII*

A high-pressure polyethylene sample identical to that of Example V was blended with 0.10% by weight of oleamide as a slip additive and 0.0025% by weight of 2,6-di-tert-butyl-4-methylphenol as a stabilizer. This polyethylene sample was oven aged at 100° C. for approximately 500 hours and the melt index was found to have increased from 2.0 to 11.2. The anti-block property of the polyethylene film was found to be 0.80 gm. per centimeter and the haze was 5.2.

It will be apparent to those skilled in the art that the above examples demonstrate the superiority of diatomaceous earth treated with an alkaline solution compared to untreated diatomaceous earth with respect to resistance of polyethylene to thermal oxidative degradation. It will further be apparent that this surprising and unexpected result is accomplished without any decrease in the usual anti-blocking properties exhibited by polyethylene having incorporated therein a small amount of diatomaceous earth. It is surprising, indeed, that the well known degradation effect of diatomaceous earth on polyethylene is, for all practicel purposes, eliminated by a simple prior treatment of the diatomaceous earth with an alkaline solution.

*Example IX*

A sample of high-pressure polyethylene identical to that of Example V and having a melt index of 1.9 was blended with 0.05% by weight calcium hydroxide. The sample of polymer was oven aged at 100° C. for 48 hours and the melt index was found to be 5.9. A similar sample blended with 0.05% by weight calcium hydroxide was oven aged at 100° C. for 96 hours but the melt index was too high to measure.

In another experiment, samples of high-pressure polyethylene having a melt index of 1.8 and identical to that above except that no additive is introduced into the polymer were oven aged for 48 hours and 96 hours at 100° C. The melt index of the polymer sample oven aged for 48 hours was 5.6 and the melt index of the polymer sample oven aged for 96 hours was too high to determine.

Example IX shows that the improved stabilization effect derived from the treatment of diatomaceous earth with an alkaline solution and the subsequent incorporation of the diatomaceous earth into polyethylene in accordance with this invention cannot be duplicated by merely incorporating into the polyethylene a minor amount of an alkali. Thus, polyethylene having incorporated therein a small amount of a calcium hydroxide shows no increase in stabilization as compared with a sample of polyethylene with no calcium hydroxide incorporated therein.

The diatomaceous earth treated with an alkline solution may be incorporated into the polymers by any suitable means such as by milling the polymer on a roll mill or in an intensive type mixer such as a Banbury mixer. Incorporation can also be effected by solution blending or the like. The diatomaceous earth must be incorporated in the polyethylene by a method which insures a uniform mixture of the components and, therefore, usually a temperature sufficient to cause a softening of the polyethylene is used. Preferably, the polyethylene and diatomaceous earth are blended at a temperature somewhat above the softening point of polyethylene.

The amount of alkali-treated diatomaceous earth present in the compositions of this invention is usually in the range from about 0.01 weight percent to about 1 weight percent of the total composition. The preferred amount, however, is in the range from about 0.04 weight percent to about 0.5 weight percent.

The alkaline solution used for treatment of the diatomaceous earth may be prepared from aqueous ammonia or any soluble alkali or alkaline earth salt or hydroxide such as sodium hydroxide, potassium hydroxide, calcium hydroxide in slurry, ammonium carbonate, sodium phosphate, lithium hydroxide, sodium tetraborate, potassium diphosphate and triphosphate, barium hydroxide, and strontium hydroxide and should have a concentration of alkali or alkaline earth material of from about 1% to about 50% and preferably from about 5% to about 30%.

The treatment of the diatomaceous earth with the alkaline solution is a relatively simple process. The diatomaceous earth and alkaline solution are slurried or mixed together at atmospheric pressure and temperature for a time to accomplish intimate mixing, and ordinarily a time in the range of from one to about 60 minutes is sufficient. Preferably from about 2 to 10 minutes is needed for the best results and it is desirable to use a stirring or mixing device to be sure there is intimate contact of the components. After mixing and contact of the diatomaceous earth with the alkaline solution, the diatomaceous earth is separated by filtering, washed with water to remove entrained alkaline solution, and dried for about 48 hours to dryness, in an oven or other heating device at a temperature of from about 100° C. to about 150° C. to remove water. The diatomaceous earth free of water is then ready for incorporation into ethylene polymers and copolymers.

Examples of the most effective antioxidants for polyethylene which may be used in combination with the alkali-treated diatomaceous earth of this invention are the dialkyl sulfides, the hindered phenols and the secondary aromatic amines. The hindered phenols provide good color, while the amines are poor in this respect. Consequently, the hindered phenols are used whenever good color is desired, even though the amines are generally regarded as more effective in other respects such as high temperature stabilization and oxidation resistance. An example of one of the more effective and widely used phenols is 2,6-di-tert-butyl-4-methyl-phenol, known as Ionol. The higher dialkyl sulfides show moderate stabilizing activity in polyethylene, but low molecular weight sulfides are poor in this respect. The antioxidant concentration in the polyethylene composition can carry from as little as 5 parts to 5,000 parts per million parts of polyethylene. Generally, the concentration of antioxidant preferred is from 10 parts per million to 1,000 parts per million and is many times less than the concentration of antioxidant required when employing untreated diatomaceous earth as an anti-block agent.

Thus, ethylene polymers and copolymers containing diatomaceous earth treated with an alkaline solution in accordance with this invention have an extended life expectancy due to the reduced tendency to degrade when compared with polymers containing diatomaceous earth not treated with an alkaline solution, in a wide diversity of uses, including outdoor applications requiring prolonged exposure to the elements. The polymers of this invention can be cast, extruded, rolled or molded into sheets, rods, tubes, piping, filaments and other shaped articles, including the widely used films of the polymer from about 0.2 to 100 mils in thickness. The polymers can be used for coating paper, wire, metal foil, glass fiber fabrics, synthetic and natural textiles and other such materials.

Small amounts of other additives such as other polymers, resins or plastics, as well as stabilizers or inhibitors, dyes, pigments, fillers, lubricants, slip additives, and plasticizers that are commonly added to ethylene polymers and copolymers for specific uses can be incorporated into the polymer compositions of this invention. These, however, should not be added in an amount which adversely affects the anti-blocking characteristics obtained by the addition of the diatomaceous earth.

Though the invention has been exemplified in connection with a specific polyolefin, that is, polyethylene, it is manifest that the principles thereof can be applied to copolymers of ethylene as well as other polyolefins. Preferably the copolymers of ethylene contain up to 50% by weight of an ethylenically unsaturated comonomer such as propylene, isobutylene, vinyl acetate or the like.

What is claimed is:

1. A method for improving the anti-block characteristics of polyethylene without promoting degradation under conditions of elevated temperature and mechanical working which comprises incorporating in said polyethylene from about 0.01 to about 1.0% by weight of a diatomaceous earth which has been treated by intimately admixing said diatomaceous earth at atmospheric pressure and temperature with an excess of an aqueous alkaline solution having a concentration from about 1% to about 50% of an alkali selected from the group consisting of ammonia and the alkali metal and alkaline earth metal hydroxides, carbonates and phosphates, separating said diatomaceous earth from said solution by filtration, washing it with an excess of water, and then heating it to dryness at a temperature from about 100° to 150° C.

2. The method of claim 1 wherein said admixing of said diatomaceous earth and said aqueous alkaline solution is for a period from about 1 to about 60 minutes, said aqueous alkaline solution has a concentration of from about 5% to about 30% of alkali, and said drying is effected over a period from about 24 to about 48 hours.

3. The method of claim 2 wherein the amount of said diatomaceous earth incorporated in said polyethylene is from about 0.04 to about 0.5% by weight.

4. The method of claim 2 wherein said alkali is ammonia.

5. The method of claim 2 wherein said alkali is sodium carbonate.

6. The method of claim 2 wherein said alkali is a mixture of sodium phosphates.

References Cited by the Examiner

UNITED STATES PATENTS 3,012,003  12/1961  Speyer _____ 260—45.7
3,028,355  4/1962   Toy et al.

MORRIS LIEBMAN, *Primary Examiner.*

A. LIEBERMAN, *Assistant Examiner.*